United States Patent
Wong et al.

(10) Patent No.: US 9,121,432 B2
(45) Date of Patent: Sep. 1, 2015

(54) NUT PLATE FASTENER WITH ELONGATED FASTENER APERTURE

(71) Applicant: United Technologies Corporation, Hartford, CT (US)

(72) Inventors: Joey Wong, Enfield, CT (US); Jose E. Ruberte Sanchez, Jupiter, FL (US)

(73) Assignee: United Technologies Corporation, Hartford, CT (US)

(*) Notice: Subject to any disclaimer, the term of this patent is extended or adjusted under 35 U.S.C. 154(b) by 110 days.

(21) Appl. No.: 13/714,975

(22) Filed: Dec. 14, 2012

(65) Prior Publication Data

US 2014/0169908 A1    Jun. 19, 2014

(51) Int. Cl.
  *F16B 37/06*    (2006.01)
  *F16B 37/04*    (2006.01)

(52) U.S. Cl.
  CPC ............ *F16B 37/045* (2013.01); *F16B 37/044* (2013.01); *F16B 37/064* (2013.01)

(58) Field of Classification Search
  USPC .................... 411/104, 111–113, 965, 84, 969
  See application file for complete search history.

(56) References Cited

U.S. PATENT DOCUMENTS

| | | | | |
|---|---|---|---|---|
| 2,144,350 | A | * | 1/1939 | Swanstrom ...................... 411/84 |
| 2,542,375 | A | * | 2/1951 | Torresen ......................... 411/84 |
| 2,605,668 | A | * | 8/1952 | Hollopeter ..................... 411/342 |
| 2,705,991 | A | * | 4/1955 | Reiner ............................. 411/84 |
| 3,217,772 | A | * | 11/1965 | Adams ........................... 411/112 |
| 4,695,212 | A | | 9/1987 | Berecz |
| 4,768,907 | A | | 9/1988 | Gauron |
| 5,605,353 | A | * | 2/1997 | Moss et al. ..................... 280/784 |
| 5,624,319 | A | * | 4/1997 | Golczyk et al. ................. 470/21 |
| 5,716,178 | A | | 2/1998 | Vu |
| 6,027,293 | A | * | 2/2000 | Beemer et al. ................ 411/119 |
| 6,146,071 | A | * | 11/2000 | Norkus et al. ................ 411/104 |
| 6,595,732 | B2 | * | 7/2003 | Werner et al. ................ 411/104 |
| 7,059,816 | B2 | | 6/2006 | Toosky |
| 7,114,900 | B2 | | 10/2006 | Toosky |
| 8,312,726 | B2 | | 11/2012 | Wong et al. |
| 2010/0034612 | A1 | * | 2/2010 | Pau ................................. 411/108 |
| 2010/0050643 | A1 | | 3/2010 | Snyder et al. |
| 2011/0123323 | A1 | | 5/2011 | Ruberte Sanchez et al. |
| 2011/0297758 | A1 | | 12/2011 | Ruberte Sanchez et al. |
| 2012/0297758 | A1 | | 11/2012 | Nelson et al. |

* cited by examiner

*Primary Examiner* — Flemming Saether

(74) *Attorney, Agent, or Firm* — O'Shea Getz P.C.

(57) ABSTRACT

A nut plate fastener includes a basket and a nut. The basket includes a web that extends laterally between a plurality of lipped flanges. The web and the lipped flanges form a channel that extends longitudinally through the basket. The web includes a fastener aperture, with an elongated cross-sectional geometry, that extends vertically through the web. The nut is arranged within the channel and aligned longitudinally with the fastener aperture. The lipped flanges retain the nut laterally and vertically within the channel.

20 Claims, 5 Drawing Sheets

NUT PLATE FASTENER WITH ELONGATED FASTENER APERTURE

This invention was made with government support under Contract No. N00019-02-C-3003 awarded by the United States Air Force. The government may have certain rights in the invention.

BACKGROUND OF THE INVENTION

1. Technical Field

This disclosure relates generally to mechanical fasteners and, more particularly, to a nut plate fastener.

2. Background Information

A nut plate fastener is typically utilized in a bolted joint for connecting a plurality of bodies together. One such nut plate fastener includes a gang channel nut, a nut basket, and a bolt with a head and a shaft. The nut is arranged within a channel of the basket, and secured to the basket such that the nut does not rotate within the channel. The basket is connected to one of the bodies with a plurality of rivets. The shaft extends from the head, through respective circular bolt holes in the bodies and a circular bolt hole in the basket, and into the nut. Such a nut plate fastener, however, typically cannot adjust for an axial misalignment between the bolt holes in the bodies beyond differences in the diameters of the shaft and the bolt holes.

There is a need in the art for an improved nut plate fastener.

SUMMARY OF THE DISCLOSURE

According to an aspect of the invention, a nut plate fastener is provided that includes a basket and a nut. The basket includes a web that extends laterally between a plurality of lipped flanges. The web and the lipped flanges form a channel that extends longitudinally through the basket. The web includes a fastener aperture, with an elongated cross-sectional geometry, that extends vertically through the web. The nut is arranged within the channel and aligned longitudinally with the fastener aperture. The lipped flanges retain the nut laterally and vertically within the channel.

According to another aspect of the invention, another nut plate fastener is provided that includes a basket, a nut and a fastener. The basket includes a channel and a fastener aperture with an elongated cross-sectional geometry. The channel extends longitudinally through the basket, laterally within the basket and vertically into the basket. The nut is arranged within the channel, and is retained laterally and vertically within the channel by the basket. The fastener extends vertically through the fastener aperture and into the nut.

According to still another aspect of the invention, an assembly is provided that includes a first body, a second body, a basket, a nut and a fastener. The second body is engaged with the first body. The basket is connected to the second body, and includes a channel and a fastener aperture with an elongated cross-sectional geometry. The nut is arranged within the channel. The nut includes a threaded aperture that extends along an axis, and the basket constrains rotation of the nut about the axis. The fastener extends through the first body, the second body and the fastener aperture, and into the threaded aperture.

The fastener aperture may have a lateral width and a longitudinal length. The longitudinal length may be greater than or less than the lateral width.

The nut plate fastener may include a fastener that extends vertically through the fastener aperture and is threaded into the nut.

The nut may include a base connected to a sleeve. The basket may retain the base laterally and vertically within the channel. The lipped flanges, for example, may retain the base laterally and vertically within the channel. The sleeve may extend vertically out of the channel.

The base may have a substantially quadrilateral cross-sectional geometry; e.g., a substantially square or rectangular cross-sectional geometry.

One or more of the lipped flanges may each include a flange and a lip. The flange may extend vertically from the web to the lip. The lip may laterally overlap a portion of the web and the nut.

The nut may include a threaded aperture that extends vertically along an axis. The basket may constrain rotation of the nut about the axis. A first of the lipped flanges, for example, may constrain rotation of the nut about the axis.

The basket may include one or more retainers that retain the nut longitudinally within the channel. One or more of the retainers may be configured as fasteners. One or more of the retainers may be configured as tabs.

The first body and the second body may each be a component of a turbine engine.

The foregoing features and the operation of the invention will become more apparent in light of the following description and the accompanying drawings.

DETAILED DESCRIPTION OF THE INVENTION

Figure 1:
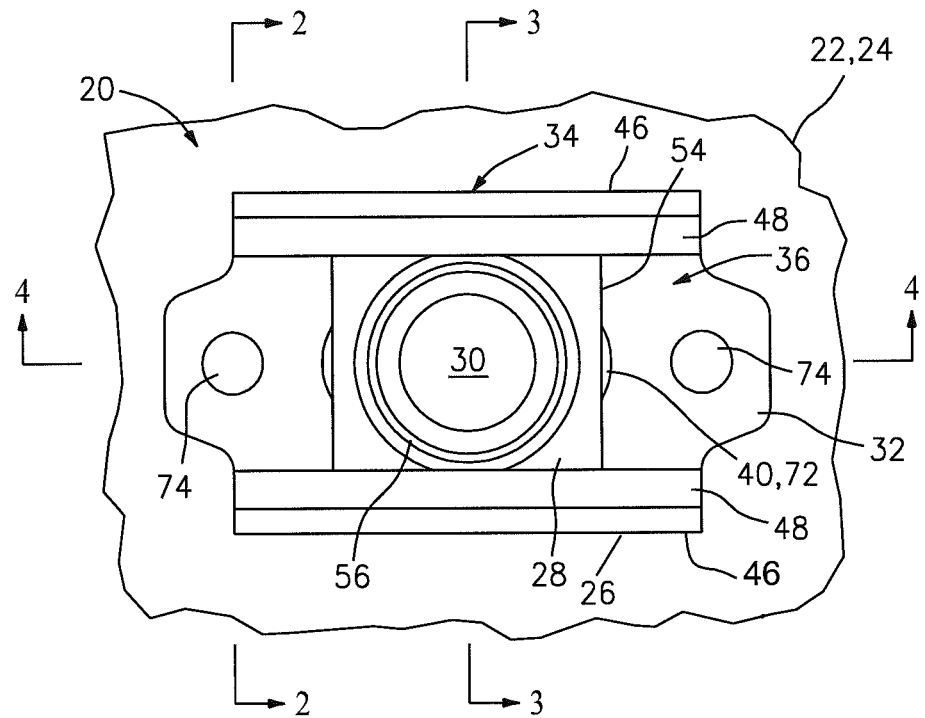
FIG. 1 is an illustration of an assembly that includes a nut plate fastener for connecting a plurality of bodies.
Figure 2:
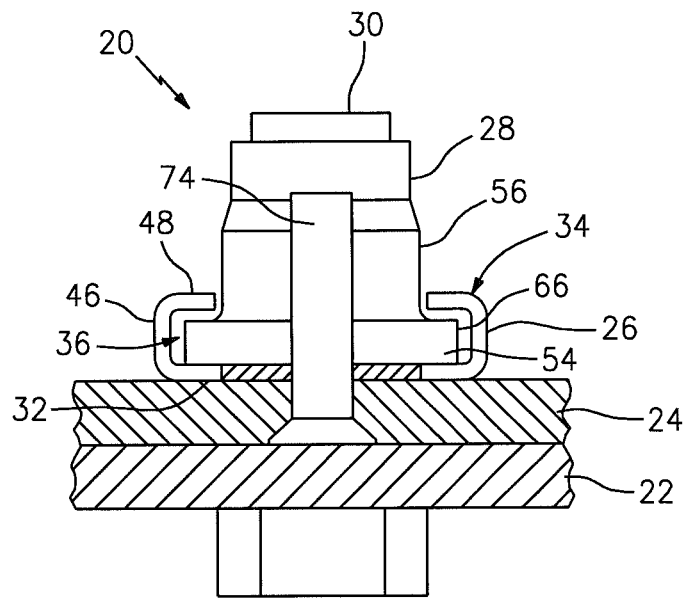
FIG. 2 is a cross-sectional illustration of the assembly of FIG. 1.
Figure 3:
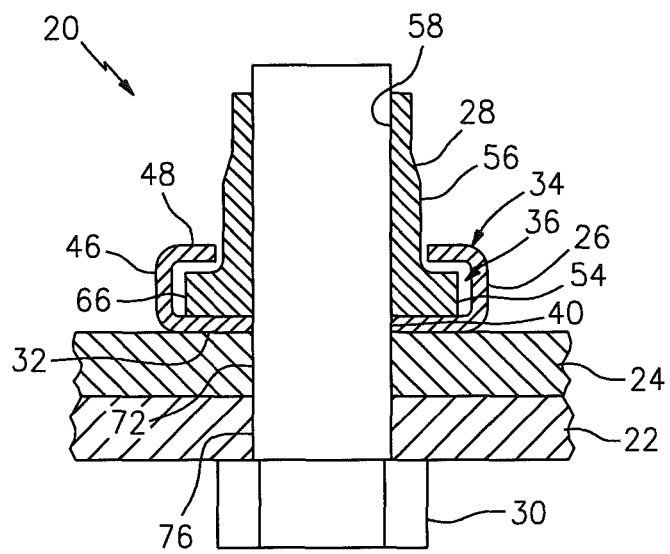
FIG. 3 is another cross-sectional illustration of the assembly of FIG. 1.
Figure 4:
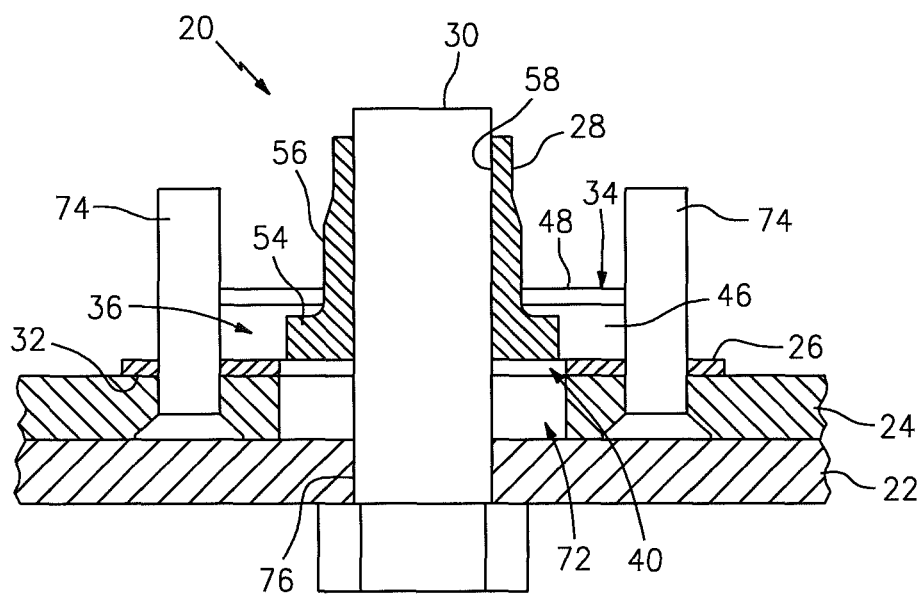
FIG. 4 is a side sectional illustration of the assembly of FIG. 1.

FIGS. 1-4 illustrate an assembly that includes a nut plate fastener 20 for connecting a plurality of bodies 22 and 24. An example of the first body 22 is a turbine engine combustor wall. An example of the second body 24 is a mounting bracket for a turbine engine igniter. The nut plate fastener 20 includes a nut basket 26 (e.g., a length of c-channel), a channel nut 28 (e.g., a gang channel nut), and a fastener 30.

Figure 5:
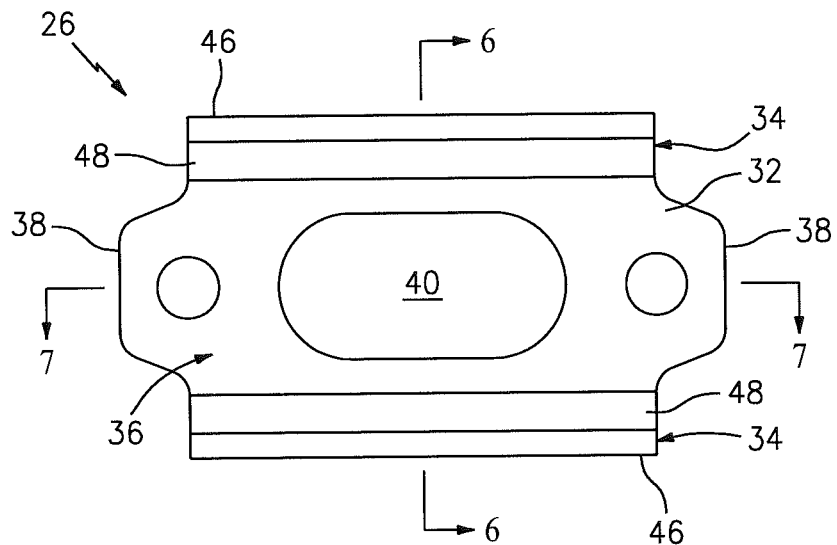
FIG. 5 is an illustration of a nut basket for the nut plate fastener of FIG. 1.
Figure 6:
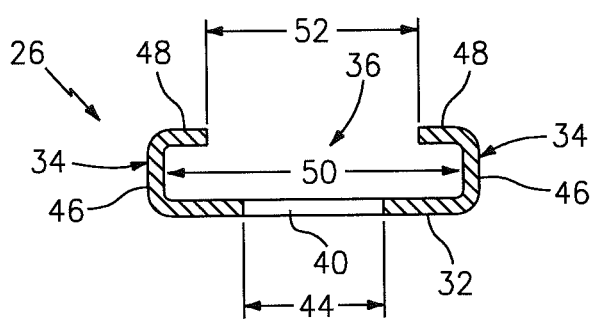
FIG. 6 is a cross-sectional illustration of the nut basket of FIG. 5.
Figure 7:
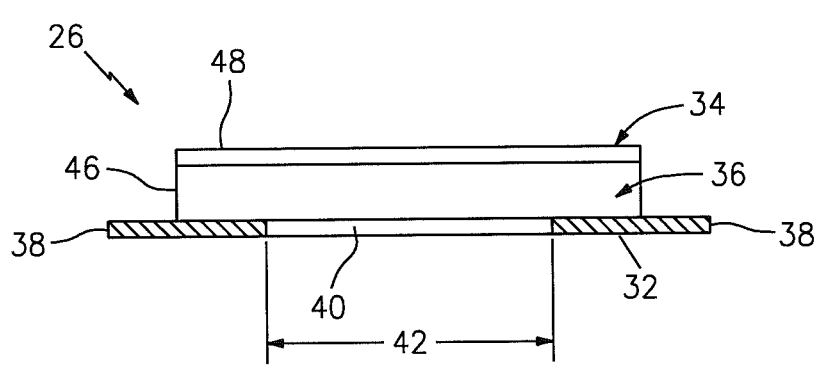
FIG. 7 is a side sectional illustration of the nut basket of FIG. 5.

Referring to FIGS. 5-7, the basket 26 includes a web 32, a plurality of lipped flanges 34 and a channel 36 (e.g., a gang channel). The web 32 extends longitudinally between opposing ends 38 of the basket 26. The web 32 extends laterally between the lipped flanges 34. The web 32 includes a fastener aperture 40, with an elongated cross-sectional geometry, that extends vertically through the web 32. The fastener aperture 40 has a longitudinal length 42 and a lateral width 44. In the basket 26 embodiment of FIGS. 5-7, the longitudinal length 42 is greater than the lateral width 44. In alternate embodiments, however, the lateral width 44 may be greater than the longitudinal length 42.

One or more of the lipped flanges 34 each includes a flange 46 and a lip 48. The flanges 46 extend vertically from the web 32 to the respective lips 48. The flanges 46 are separated from one another by a lateral width 50. The lips 48 extend laterally from the respective flanges 46 towards one another, thereby laterally overlapping a portion of the web 32. The lips 48 are separated from one another by a lateral width 52.

The channel 36 is formed by the web 32 and the lipped flanges 34. The channel 36 extends longitudinally through the basket 26. The channel 36 extends laterally within the basket 26 between the lipped flanges 34. The channel 36 extends vertically into the basket 26 to the web 32.

Figure 8:
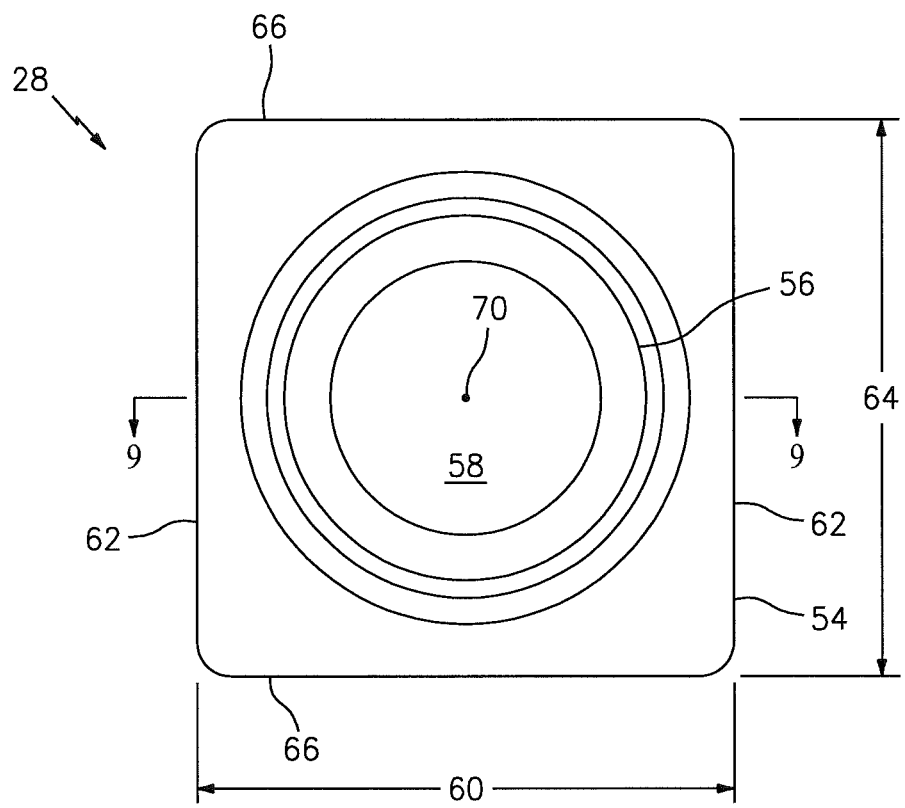
FIG. 8 is an illustration of a channel nut for the nut plate fastener of FIG. 1.
Figure 9:
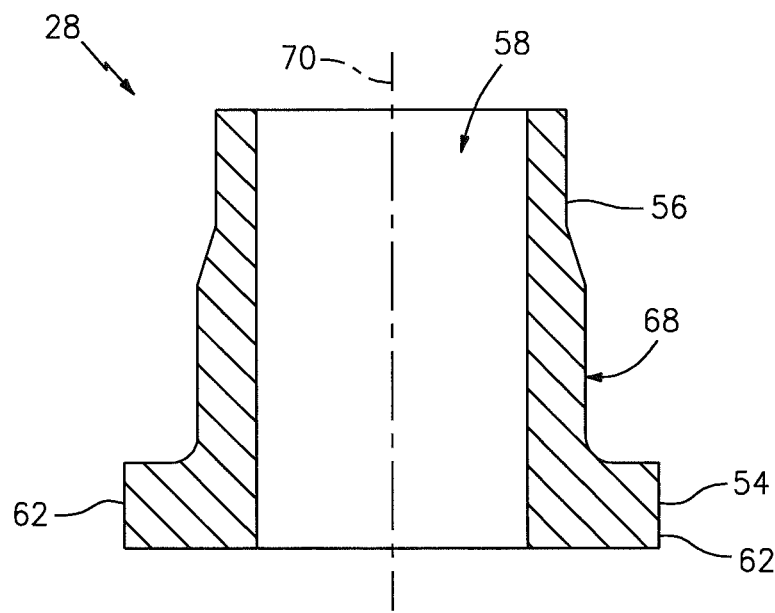
FIG. 9 is a side sectional illustration of the channel nut of FIG. 8.

Referring to FIGS. 8 and 9, the nut 28 includes a base 54, a sleeve 56 and a threaded aperture 58. The base 54 has a longitudinal length 60 that extends between opposing first sides 62 of the nut 28. The base 54 has a lateral width 64 that extends between opposing second sides 66 of the nut 28. The lateral width 64 is substantially equal to the longitudinal length 60, which provides the base 54 with a substantially square cross-sectional geometry. The lateral width 64 is less than the lateral width 50 (see FIG. 6) and greater than the lateral width 52 (see FIG. 6). The sleeve 56 is connected to the base 54, and has an outside diameter 68 that is less than the lateral width 64 and the lateral width 52 (see FIG. 6). The threaded aperture 58 extends along an axis 70 through the base 54 and the sleeve 56.

Referring to FIGS. 1-4, the second body 24 is arranged adjacent and engages the first body 22. The nut 28 is slidably mated with the basket 26. The base 54 is arranged within the channel 36 laterally between the flanges 46, and vertically between the web 32 and the lips 48. The lipped flanges 34 therefore may retain the nut 28 laterally and vertically within the channel 36, for example, before the nut 28 is mated with the fastener 30. The sleeve 56 is arranged laterally between the lips 48, and extends vertically out of the channel 36 from the base 54. The fastener aperture 40 is aligned with a fastener aperture 72 that extends vertically through the second body 24. The basket 26 is connected to the second body 24, for example, with one or more fasteners 74 (e.g., rivets). The nut 28 is longitudinally aligned with the fastener aperture 40 as well as a fastener aperture 76 that extends vertically through the first body 22. The fastener 30 extends vertically through the fastener apertures 76, 72 and 40 and into the threaded aperture 58. As the fastener 30 is rotated and threaded into the nut 28, one or more of the second sides 66 of the nut 28 may respectively laterally engage the flanges 46. The lipped flanges 34 therefore may constrain rotation of the nut 28 about the axis 70 (see FIGS. 8 and 9) during installation and/or removal of the fastener 30.

Figure 10:
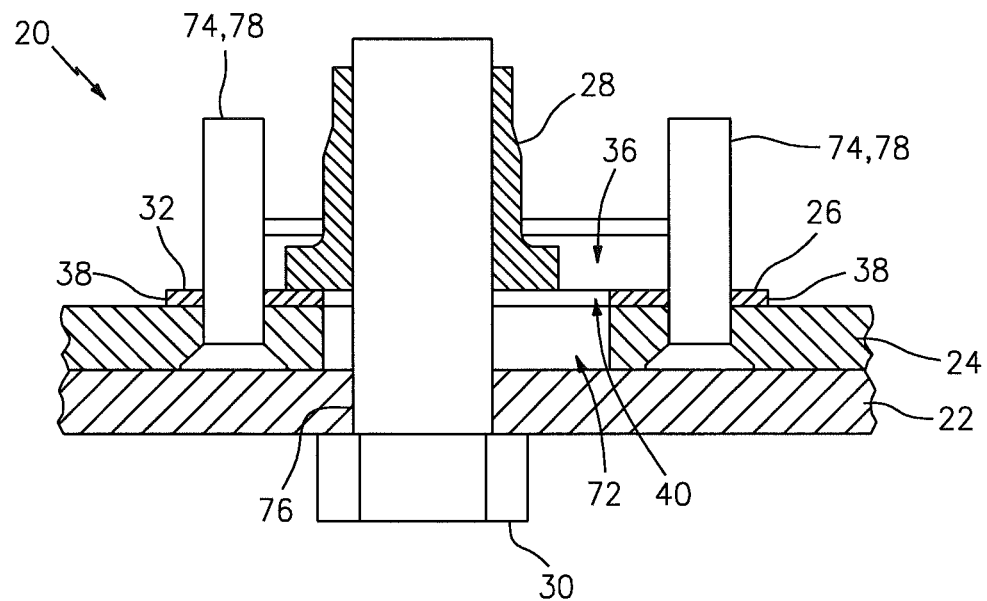
FIG. 10 is another side sectional illustration of the assembly of FIG. 1.

Referring to FIG. 10, the fastener aperture 76 in the first body 22 and the fastener aperture 72 in the second body 24 may be axially misaligned in some applications; e.g., the apertures 76 and 72 may be non-coaxial. The nut plate fastener 20 may adjust for such an axial misalignment. The elongated cross-sectional geometry of the fastener aperture 40 enables the nut 28 and the fastener 30 to be longitudinally shifted relative to the basket 26 in order to be aligned with the fastener aperture 76.

To further accommodate for axial misalignments between the fastener apertures 76 and 72, the fastener aperture 72 may have an elongated cross-sectional geometry similar to that of the fastener aperture 40. In other embodiments, the fastener aperture 72 may have a substantially circular cross-sectional geometry with a diameter that is greater than that of the fastener aperture 76; e.g., substantially equal to the longitudinal length 42 (see FIG. 7). The present invention, however, is not limited to any particular fastener aperture geometries and/or relative dimensions.

Figure 11:
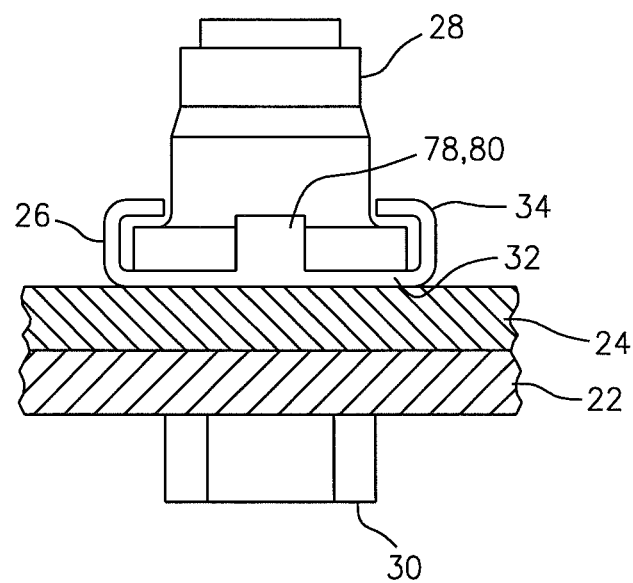
FIG. 11 is an illustration of an alternative embodiment nut plate fastener for connecting a plurality of bodies.

The nut plate fastener 20 may include one or more nut retainers 78. In the embodiment of FIG. 10, the fasteners 74 are configured as the retainers 78. The fasteners 74 are arranged at the respective ends 38 of the web 32, and may retain the nut 28 longitudinally within the channel 36 by obstructing (e.g., plugging) respective ends of the channel 36. The present invention, however, is not limited to any particular type and/or configuration of nut retainers. In the embodiment of FIG. 11, for example, the retainers 78 are configured as tabs 80 that extend vertically out from the web 32. In other embodiments, one or more of the retainers 78 may be configured as other types of protrusions (e.g., weld buildup, pedestals, etc.) that are connected to the web 32 or another portion of the basket 26.

In some embodiments, the base 54 may have a substantially rectangular cross-sectional geometry, for example, where the longitudinal length 60 is different (e.g., greater) than the lateral width 64. In some embodiments, the base 54 may have various quadrilateral cross-sectional geometries other than a square or rectangular cross-sectional geometry. In some embodiments, the base 54 may have an elongated circular cross-sectional geometry; e.g., an oval or elliptical cross-sectional geometry. The present invention therefore is not limited to any particular base geometries.

In some embodiments, the nut 28 may have various configurations other than that described above and illustrated in the drawings. For example, the threaded aperture 58 may extend partially into the nut 28. In another example, the nut 28 may be configured without the sleeve 56. The present invention therefore is not limited to any particular nut configurations.

The term "at" may describe a relative location that is adjacent, proximate or on another location. The term "fastener" may describe a rivet, a screw, a bolt, a nut and bolt, a pin (e.g., a cotter pin or a twist lock pin), a latch or lock, a linkage, etc. The term "connect" may describe a direct or indirect connection between a plurality of elements, which connection may be made by mechanically fastening, welding, brazing or otherwise adhering the elements together. The term "engage" may describe how a plurality of elements contact one another, or transfer forces between one another through an intermediate medium such as, for example, a seal, wear member, coating, etc. The term "aperture" may describe a hole, a channel, a slot, an indentation, etc. The term "constrain" may describe preventing or limiting a movement or action.

The terms "longitudinal", "lateral" and "vertical" are used to orientate the nut plate fastener 20 components and the bodies 22 and 24 relative to one another. A person of skill in the art will recognize, however, the nut plate fastener 20 components may be utilized in other orientations than those described above. In alternate embodiments, for example, the term "vertical" may describe a direction that is perpendicular to the force of gravity. The present invention therefore is not limited to any particular spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A nut plate fastener, comprising:
   a basket including a web that extends laterally between a plurality of lipped flanges, the web and the lipped flanges forming a channel that extends longitudinally through the basket, wherein the web includes a fastener aperture, with an elongated cross-sectional geometry, that extends vertically through the web, and wherein the basket consists essentially of a length of c-channel;
   a nut arranged within the channel and aligned longitudinally with the fastener aperture, wherein the lipped flanges retain the nut laterally and vertically within the channel; and
   a plurality of retainer fasteners that retain the nut longitudinally within the channel.

2. The nut plate fastener of claim 1, wherein the fastener aperture has a lateral width and a longitudinal length that is greater than the lateral width.

3. The nut plate fastener of claim 1, further comprising a fastener that extends vertically through the fastener aperture and is threaded into the nut.

4. The nut plate fastener of claim 1, wherein the nut includes a base connected to a sleeve, the lipped flanges retain the base laterally and vertically within the channel, and the sleeve extends vertically out of the channel.

5. The nut plate fastener of claim 4, wherein the base has a substantially quadrilateral cross-sectional geometry.

6. The nut plate fastener of claim 1, wherein each of the lipped flanges includes a flange and a lip, the flange extends vertically from the web to the lip, and the lip laterally overlaps a portion of the nut.

7. The nut plate fastener of claim 1, wherein the nut includes a threaded aperture that extends vertically along an axis, and a first of the lipped flanges constrains rotation of the nut about the axis.

8. The nut plate fastener of claim 1, wherein the retainer fasteners are rivets.

9. An assembly, comprising:
   a body;
   a basket including a web that extends laterally between a plurality of lipped flanges, the web and the lipped flanges forming a channel that extends longitudinally through the basket, wherein the web includes a fastener aperture, with an elongated cross-sectional geometry, that extends vertically through the web; and
   a nut arranged within the channel and aligned longitudinally with the fastener aperture, wherein the lipped flanges retain the nut laterally and vertically within the channel;
   wherein the basket includes a plurality of retainer fasteners that retain the nut longitudinally within the channel; and
   wherein a first of the retainer fasteners connects the basket to the body.

10. The assembly of claim 9, wherein an aperture with an elongated cross-sectional geometry is aligned with the fastener aperture.

11. An assembly, comprising:
    a body;
    a basket located to a side of and connected to the body, the basket including a channel and a fastener aperture with an elongated cross-sectional geometry, wherein the channel extends longitudinally through the basket, laterally within the basket and vertically into the basket, and wherein the basket further includes a plurality of retainer fasteners that retain the nut longitudinally within the channel;
    a nut arranged within the channel, wherein nut is retained laterally and vertically within the channel by the basket; and
    a fastener extending vertically through the fastener aperture and into the nut.

12. The assembly of claim 11, wherein the basket includes a web that extends laterally between a plurality of lipped flanges, the web and the lipped flanges form the channel, and the lipped flanges retain the nut laterally and vertically within the channel.

13. The assembly of claim 11, wherein the fastener aperture has a lateral width and a longitudinal length that is greater than the lateral width.

14. The assembly of claim 11, wherein the nut includes a base connected to a sleeve, the basket retains the base laterally and vertically within the channel, and the sleeve extends vertically out of the channel.

15. The assembly of claim 14, wherein the base has a substantially quadrilateral cross-sectional geometry.

16. The assembly of claim 11, wherein the nut includes a threaded aperture that extends vertically along an axis, and the basket constrains rotation of the nut about the axis.

17. An assembly, comprising:
    a first body;
    a second body adjacent and engaged with the first body;
    a basket connected to the second body, and including a channel and a fastener aperture with an elongated cross-sectional geometry, and wherein the basket further includes a plurality of retainer fasteners that retain the nut longitudinally within the channel;
    a nut arranged within the channel, and including a threaded aperture that extends along an axis, wherein the basket constrains rotation of the nut about the axis; and
    a fastener extending through the first body, the second body and the fastener aperture, and into the threaded aperture.

18. The assembly of claim 17, wherein
    the channel extends longitudinally through the basket, laterally within the basket and vertically into the basket;
    the basket includes a web that extends laterally between a plurality of lipped flanges;
    the web and the lipped flanges form the channel; and
    the lipped flanges retain the nut laterally and vertically within the channel.

19. The assembly of claim 17, wherein the first body and the second body each comprises a component of a turbine engine.

20. The assembly of claim 17, wherein the fastener extend through an aperture with an elongated cross-sectional geometry in the second body.

* * * * *